Patented Nov. 1, 1949

2,486,416

UNITED STATES PATENT OFFICE 2,486,416

PROCESS FOR MAKING ALKYL ESTERS OF ARYL SULFONIC ACID

Donald R. Jackson, Wyandotte, Mich., assignor to Wyandotte Chemicals Corporation, Wyandotte, Mich., a corporation of Michigan No Drawing. Application February 13, 1947, Serial No. 728,389

7 Claims. (Cl. 260—456)

This invention relates to an improved process for making alkyl esters of aryl sulfonic acids, which process is in turn based upon the reaction of an aromatic sulfonyl chloride with a mono- or poly-hydroxy aliphatic alcohol. This reaction is illustrated by the following chemical equation:

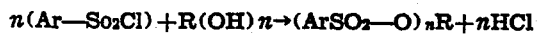
$n(\text{Ar}-\text{SO}_2\text{Cl}) + \text{R}(\text{OH})n \rightarrow (\text{ArSO}_2-\text{O})_n\text{R} + n\text{HCl}$ where:
Ar stands for an aryl group
R stands for an alkyl group, preferably 1 to 8 C atoms
$n$ is an integer of at least 1.

It has previously been known to conduct this reaction in the presence of a relatively weak (viz: 20%) solution of sodium hydroxide at temperatures on the order of 0° C., and in the presence of an organic solvent. See Földi—Berichte, 60 B, 656 (1927). The low temperatures of operation were previously found to be necessary in order to avoid saponification of the aromatic sulfonyl chloride by the caustic soda. This condition in turn led to the production of a highly viscous reaction mass in which NaCl precipitated out. This latter difficulty was attempted to be overcome by the use of an organic solvent as a diluent, but this in turn tended to deposit the NaCl on the walls of the reaction vessel, thereby substantially impeding heat transfer through such walls. Such prior art process has accordingly not been found feasible or adapted to commercial operation because of the relatively high expense of the degree of cooling or refrigeration required, the fire and safety hazard incident to the use of an organic solvent, and the requirement of a separate distillation step for removing the solvent from the reaction mass.

I have discovered that the subject esterification reaction can be efficiently and economically conducted in the presence of a relatively strong alkali metal hydroxide solution (viz: 35-50% NaOH or KOH), at temperatures between room temperature and 100° C., hence not requiring expensive refrigeration; and in the absence of an organic solvent. In other words, water is the only non-reactive liquid solvent or diluent present. My invention possesses the advantages in that relatively high yields are obtained, viscous and "hard-to-handle" reaction masses are avoided, deposition of inorganic salt on walls of the reaction vessel is prevented, metallic corrosion of equipment is minimized, and no hazardous distillation step is required for the removal of organic solvent. The ester products of the process of my invention are refined or purified simply by water washing to remove the caustic alkali-inorganic salt mother liquor, resulting in a product of good color which does not require any separate charcoal decolorizing treatment.

I have also discovered that the above mentioned esterification reaction is aided by the presence of a substantial excess of alkali metal hydroxide solution.

The alkyl esters of aryl sulfonic acids produced by my invention are valuable as plasticizing and alkylating agents, as well as having many other chemical and industrial uses. Typical of the esters produced by my process are: methyl benzenesulfonate, ethylene glycol dibenzenesulfonate, n-propyl benzenesulfonate, propylene glycol dibenzenesulfonate, mixtures of ethylene- and propylene-glycol dibenzenesulfonates, 2-ethylhexyl benzenesulfonate, and ethyl beta-naphthalenesulfonate. Propylene glycol dibenzenesulfonate and 2-ethylhexyl benzenesulfonate are new chemical compounds, especially useful and advantageous as plasticizing agents; and hence these new products constitute a part of my invention.

In the practice of my process, a relatively strong alkali metal hydroxide aqueous solution, of 35-50% concentration, is employed. This may be mixed either with the alcohol or with the sulfonyl halide reactant, and the remaining reactant added thereto. In a typical procedure, the alkali metal hydroxide solution is first mixed with vigorous agitation with a mono- or poly-hydroxy aliphatic alcohol. The alkali metal hydroxide, preferably caustic soda due to its commercial availability, is employed in an excess of at least 200 molar per cent of the aromatic sulfonyl halide present employed in the reaction, i. e. at least 3 mols of NaOH per mol of aromatic sulfonyl halide. The aromatic sulfonyl halide is then added gradually to the above mixture, while the temperature is maintained in a range between room temperature, or 20° C., and below 100° C. Preferably this temperature is in the range of 30-45° C. The agitation is continued during the addition of the aromatic sulfonyl chloride and during the esterification reaction. The resultant ester separates out of the reaction mass. After completion of the esterification reaction, the agitation is stopped, whereupon the ester and the aqueous upper layer are separated by decantation. The crude ester is then subjected to water washing to remove the excess NaOH, alcohol and NaCl. Such water washing is repeated, if need be, until substantially all traces of the NaOH are removed.

The washed ester product if it is one which is solid at normal temperature, can then be alternatively isolated by either one of the following procedures:

(a) The ester is transferred to molten form by raising the temperature of the reaction vessel to above the melting point of the ester, which can then be drawn off as a liquid oil, cooled, solidified and dried in customary manner such as in a drying oven.

(b) Alternatively, after the final wash in the reaction vessel, water is added and the temperature raised to above the melting point of the ester, accompanied by vigorous agitation. The temperature of the reaction vessel is then lowered below the melting point of the ester whereupon slow crystallization, with the formation of relatively fine crystalline particles of the ester, takes place. The aqueous slurry of water and crystallized ester is then filtered and dried.

In order to enable those skilled in the art more readily to understand and practice my invention, the following examples are set forth by way of detailed illustrations, but not necessarily in limitation of the scope thereof.

EXAMPLE 1

Methyl benzenesulfonate

Methanol in the amount of 2 gram mols was mixed, with vigorous stirring with 375 grams of 40% aqueous NaOH solution, the latter amount representing 3.75 gram mols of anhydrous NaOH. The temperature of the reaction mixture was maintained at 30°–35° C., whereupon benzenesulfonyl chloride in the amount of 1 gram mol was gradually added over a 12-minute period. This proportion of reactants corresponded to a 275 molar per cent excess of NaOH based on the benzenesulfonyl chloride present. The agitation was continued for an additional 5 minutes and the reaction mixture diluted with 1200 grams of water. The methyl benzenesulfonate ester layer was separated by decanting the aqueous layer, and was washed 4 times with water. The methyl benzenesulfonate product was water-white in color and obtained in an amount corresponding to an 84.8% yield of the theoretical amount of ester that might have been obtained, based on the benzenesulfonyl chloride employed in the reaction.

EXAMPLE 2

Ethylene glycol dibenzenesulfonate

Ethylene glycol in the amount of 248 grams or 4 gram mols, was mixed, with vigorous agitation, with 1500 grams of 40% aqueous NaOH solution (15 gram mols of NaOH, anhydrous basis), and the temperature of the mixture cooled by water circulated in a cooling jacket on the reaction vessel, so that the temperature did not exceed 40° C. Benzenesulfonyl chloride in the amount of 706 grams or 4 gram mols was then added gradually, with continued vigorous agitation and at a temperature of 37–40° C. The NaOH was thus present in an amount corresponding to 275 molar per cent excess of the benzenesulfonyl chloride.

It will be noted that the quantity of ethylene glycol represents a 100% excess over that required for the formation of the diester. However, regardless of the amount of excess of ethylene glycol, substantially no monoester is formed.

The reaction mixture, after the addition of the benzenesulfonyl chloride over a period of 30 minutes and continued agitation for 10 minutes after the completion of such addition, was then diluted with water and the upper aqueous layer decanted. The solid ester was washed several times by stirring with fresh portions of water, finally stirred with water at a temperature above its melting point (about 51° C.), and then allowed to crystallize while being stirred. The resultant slurry was filtered and dried at room temperature. The yield was 556 grams of ethylene glycol dibenzenesulfonate, or 81.3% based on the benzenesulfonyl chloride present. The ester, on analysis, had a saponification number of 322 and a melting point of 48.5–50.6° C.

EXAMPLE 3 n-Propyl benzenesulfonate n-Propyl alcohol in the amount of 120 grams or 2 gram mols, was mixed with 375 grams of 40% NaOH. Benzenesulfonyl chloride in the amount of 176.5 grams or 1 gram mol was added to the vigorously stirred mixture over a period of 42 minutes with the reaction temperature maintained at 30°–35° C. After such addition, stirring was continued for 15 minutes, the reaction mass was drowned in 1200 ml. of water. The aqueous layer was removed by means of a suction leg and the solidified ester product washed 4 more times with water at 65° C. until the last wash water was neutral. The liquid ester was removed by separation in a separatory funnel and subjected to a vacuum distillation to remove any water. The product, of a light straw color, was obtained in the amount of 162.1 grams or 81.2% of the theoretical yield based upon the benzenesulfonyl chloride employed. On analysis, the n-propyl benzenesulfonyl product was found to have a saponification number of 277.8, as compared to a theoretical saponification number of 280.

EXAMPLE 4

Propylene glycol dibenzenesulfonate

Propylene glycol in the amount of 38 grams or ½ gram mol was vigorously stirred with 300 grams of 40% NaOH solution (3 gram mols of 40% NaOH, anhydrous basis). Benzenesulfonyl chloride in the amount of 88.3 grams or ½ gram mol was then added over a period of 20 minutes while the temperature of the reaction mass was maintained in the range of 30°–31° C. This proportion corresponded to a 500 molar per cent excess of NaOH, on the basis of benzenesulfonyl chloride present. The agitation was then continued for 12 more minutes. The ester product was washed with water, separated from the aqueous layer in a separatory funnel and then returned to the reaction vessel for 4 repeated washings with 600 ml. portions of water at 28° C. The solid product was air dried over night followed by drying in a desiccator. This ester had a saponification number of 300 and a melting range of 60.6°–61.8° C. The actual yield was 51.2 grams of propylene glycol dibenzenesulfonate, representing a 57.6% theoretical yield.

EXAMPLE 5

2-ethylhexyl benzenesulfonate 2-ethylhexanol in the amount of 104 grams or 0.8 gram mols was. vigorously stirred with 375 grams of 40% NaOH (3.75 gram mols of NaOH, anhydrous basis). Benzenesulfonyl chloride in the amount of 176.5 grams or 1 gram mol was then added with continued agitation and with the temperature of the reaction mass maintained at 35°–40° C. After completion of the reaction and discontinuance of agitation, the aqueous layer was removed by a suction leg, the liquid ester product water washed until the wash water was neutral. The 2-ethylhexyl benzenesulfonate was obtained in the amount of 187.6 grams representing an 86.2% yield, based on the 2-ethylhexanol employed. This product had a saponification number of 201, which was 96.5% of theoretical.

In this example it will be noted that the amount of 2-ethylhexanol present corresponded to 0.8 mol per 1 mol of benzenesulfonyl chloride. That is to say, the alcohol was present in 0.8 of the chemically equivalent amount required to react with the aryl sulfonyl chloride. The chemically equivalent amount of alcohol reactant to aryl sulfonyl chloride in the process of my invention will thus be seen to range from 0.8/1 of this example to the 2/1 value of the remaining examples.

EXAMPLE 6

*Ethyl beta-naphthalenesulfonate*

Beta-naphthalenesulfonyl chloride (solid), in the amount of 0.2 mol (45 grams) was added gradually to a well-stirred mixture of 0.4 mol of ethanol and 75 grams (0.75 mol NaOH anhydrous basis) of 40% caustic soda, or a 275 molar per cent excess of NaOH on the basis of beta-naphthalenesulfonyl chloride present. The temperature was not allowed to exceed 40° C. and stirring was continued for one-half hour after the addition was completed. The liquid ester product was separated, washed with distilled water until neutral to alkacid paper, dried under reduced pressure at about 30° C. and filtered. The weight (34 grams) of clear, amber, slightly viscous liquid ethyl beta-naphthalenesulfonate product, melting point 10–11° C., corresponded to a yield of 72% of theoretical based on beta-naphthalenesulfonyl chloride. The following analyses were obtained:

|  | Found | Theory |
|---|---|---|
| Saponification No. | 230.5 | 236 |
| Sulfur_____Per Cent. | 13.05 | 13.55 |

The teachings of Examples 2 and 4 above can be combined to produce mixed ethylene glycol- and propylene glycol-dibenzenesulfonates, in good yield. It is not believed here necessary, in order to enable those skilled in the art readily to understand my invention, to here repeat exemplary details of the manner in which such mixed ethylene and propylene-glycol dibenzenesulfonates are made.

Other modes of applying the principle of my invention may be employed, changes being made as regards to the details described, provided the features stated in any of the following claims or the equivalent of such be employed.

I, therefore, particularly point out and distinctly claim as my invention:

1. The method of making alkyl esters of aromatic sulfonic acids comprising the steps of reacting 0.8–2 chemically equivalent amount of an aliphatic alcohol consisting of C, H and O with a unit amount of an aryl sulfonyl chloride in the presence of at least 200% molar excess, aryl sulfonyl chloride basis, of 35–50% aqueous caustic soda solution, with water as the sole diluent, and initiating and maintaining the reaction temperature in the range of 20°–100° C.

2. The method of making alkyl esters of aromatic sulfonic acids comprising the steps of reacting 0.8–2 chemically equivalent amount of an aliphatic alcohol consisting of C, H and O with a unit amount of an aryl sulfonyl chloride in the presence of at least 200% molar excess, aryl sulfonyl chloride basis, of 35–50% aqueous caustic soda solution, with water as the sole diluent, and maintaining the reaction temperature in the range of 30°–45° C.

3. The method of making aryl sulfonic acid esters of the type formula:

$$(ArSO_2-O)_nR$$

where:
Ar stands for an aryl group
R stands for an alkyl group of 1 to 8 C atoms
$n$ is an integer of at least 1 comprising reacting 0.8–2 chemically equivalent amount of an aliphatic alcohol of 1 to 8 C atoms and consisting of C, H and O, with a unit amount of an aryl sulfonyl chloride in the presence of at least 200% molar excess, aryl sulfonyl chloride basis, of 35–50% aqueous caustic soda solution, with water as the sole diluent, and maintaining a temperature during the reaction in the range of 30°–45° C.

4. The method of making alkyl esters of aromatic sulfonic acids comprising the steps of reacting 0.8–2 chemically equivalent amount of an aliphatic alcohol consisting of C, H and O with a unit amount of an aryl sulfonyl chloride in the presence of at least 200% molar excess, aryl sulfonyl chloride basis, of 35–50% aqueous caustic soda solution, with water as the sole diluent, maintaining the reaction temperature in the range of 30°–45° C., agitating the reaction mass, diluting with water, and separating out the alkyl aryl sulfonic acid ester product.

5. The method of making alkyl esters of aromatic sulfonic acids comprising the steps of reacting 0.8–2 chemically equivalent amount of an aliphatic alcohol consisting of C, H and O with a unit amount of an aryl sulfonyl chloride in the presence of at least 200% molar excess, aryl sulfonyl chloride basis, of 35–50% aqueous caustic soda solution, with water as the sole diluent, maintaining the reaction temperature in the range of 30–45° C., agitating the reaction mass, diluting with water, heating to above the melting point of the alkyl aryl sulfonic acid ester, decanting the latter as a liquid from the aqueous phase, and separating out the alkyl aryl sulfonic acid ester product.

6. The method of making methyl benzenesulfonate comprising the steps of reacting approximately 2 mols of methanol with approximately 1 mol of benzenesulfonyl chloride, in the presence of a 40% NaOH aqueous solution, the amount of NaOH present on an anhydrous basis, being at least 3 mols, and maintaining the reaction temperature in the range of 30°–35° C.

7. The method of making propylene glycol dibenzenesulfonate comprising the steps of reacting approximately 1 mol of propylene glycol with approximately 1 mol of benzenesulfonyl chloride, in the presence of approximately 6 mols on the anhydrous NaOH basis, of 40% NaOH aqueous solution, and maintaining the reaction temperature in the range of 30°–31° C.

DONALD R. JACKSON.

(References on following page)

REFERENCES CITED

The following references are of record in the file of this patent:

UNITED STATES PATENTS

| Number | Name | Date |
|---|---|---|
| 1,924,296 | Carswell | Aug. 29, 1933 |
| 2,227,708 | Cordier | Jan. 7, 1941 |
| 2,266,141 | Adams | Dec. 16, 1941 |
| 2,340,701 | Schlichting et al. | Feb. 1, 1944 |

OTHER REFERENCES

Brooks et al., "Jour. Am. Chem. Soc.," vol. 40 (1918), page 838.

Chem. Abstracts, vol. 18, page 1481 (1924).

Chem. Abstracts, vol. 21, page 1802 (1927).

Heilbron, Dictionary of Organic Compounds, vol. 1, page 128, (1934).